Patented Apr. 26, 1938

2,115,149

UNITED STATES PATENT OFFICE 2,115,149

MANUFACTURE AND APPLICATION OF AZO DYES

Kenneth Herbert Saunders, Blackley, Manchester, England, assignor to Imperial Chemical Industries Limited, a corporation of Great Britain No Drawing. Application February 23, 1935, Serial No. 7,883. In Great Britain March 8, 1934

3 Claims. (Cl. 8—5)

This invention relates to the production of new water-insoluble azo dyestuffs on the fiber by impregnating the fiber or incorporating with it new water-soluble dyestuffs which are subsequently converted on the fiber into water-insoluble products. The invention comprises accordingly the production of new water-soluble dyes and new water-insoluble dyes and their application to textile fibers.

As initial materials I employ aminoalkylbenzylamines and diaminodibenzylamines. These compounds are represented by the formula:

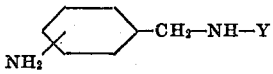

in which Y is alkyl or aminobenzyl, and the aryl nuclei are free from water solubilizing substituents. To the secondary amino group of these compounds I attach water solubilizing groups, thereby facilitating their application to the material, from which after application they may be split off.

According to one method of using the invention I immunize the secondary amine of the initial material against the action of nitrous acid by some suitable means such as reacting it with an acyl group, subject the primary amino groups to diazotization and couple the resulting diazonium compounds to suitable coupling components free from sulfonic or carboxylic acid groups, producing water-insoluble coloring matters. Whether immunization has been needed or not, the product is insoluble in water. If an immunizing group is present it may be split off and the compound converted into a water-soluble derivative by attaching to the secondary N a group which confers water solubility on the whole, for instance a diazo compound containing solubilizing groups. Thus solubilized, the compound is applied to the fiber and the residue conferring water-solubility is split off.

Alternatively, the aminoalkylbenzylamine or diaminodibenzylamine, without an immunizing group on the secondary nitrogen may be converted into an amide of 2:3-hydroxynaphthoic acid. The amide is coupled with diazo or tetrazo compounds to form water-insoluble coloring matters, which are then solubilized as previously described by attaching to a secondary nitrogen atom a suitable diazo compound. After application to the fiber the solubilizing residue is split off as described hereafter. For instance, amides may be obtained by reacting 2:3-hydroxynaphthoic acid with aminomethylbenzylamine (which may be obtained by reducing nitromethylbenzylamine; see Ingold, Journal of the Chemical Society 1925, 1814); or with aminoethylbenzylamine (which may be similarly obtained); or with diaminodibenzylamine (which may be obtained by reducing dinitrodibenzylamine (see Ingold supra, p. 1813). Representative of the amides so formed are:

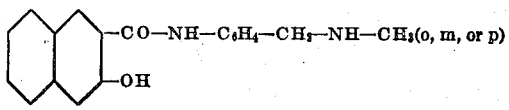

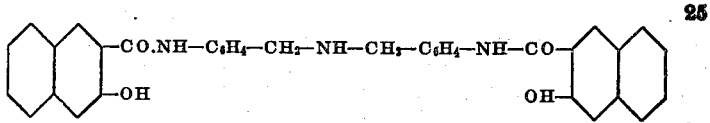

The amides so formed may be subsequently coupled to diazotized primary arylamines to form the dye, solubilized by attaching a satisfactory solubilizing group to the secondary nitrogen, applied to the fiber, and insolubilized by splitting off the solubilizing groups.

The splitting off on the fibre of the water solubilizing group or residue attached, to the secondary nitrogen, is effected by treating the material with acid at an elevated temperature. For instance the material may be treated with steam containing acetic or formic acid vapours or it may be taken through a hot bath containing salt and an acid or, to a printing paste which is applied to the fabric, there may be added substances which generate acids on steaming e. g. the ammonium salts of organic acids, ammonium thiocyanate, sodium chloroacetate, ammonium ethyl sulphate or the like.

The invention is illustrated but not limited, by the following examples, in which parts are by weight.

Example 1.—134.5 parts of diaminoacetodibenzylamine represented by the formula:

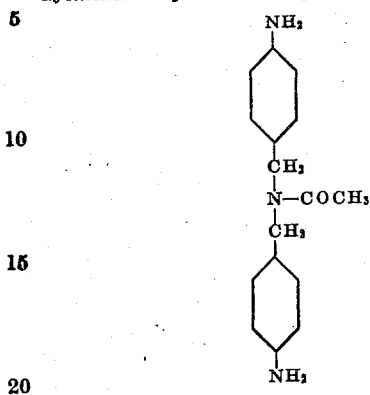

(obtained as described below) are dissolved in 300 parts of strong hydrochloric acid diluted with 1000 parts of water and diazotized with 69 parts of sodium nitrite in 150 parts of water at 0° C. The colourless diazo solution is coupled with 144 parts of β-naphthol in the usual way. Coupling rapidly takes place. The insoluble brick-red compound is filtered off, washed and dried.

Diaminoacetodibenzylamine is made as follows:—Aceto-dibenzylamine, dinitrated, as described by Ingold (Journal of the Chemical Society, 1925, 1819), is treated as follows:—

329 parts of the crude mixed isomeric dinitro acetodibenzylamines are charged into a boiling mixture of 360 parts of finely divided iron, e. g. pin dust, 360 parts of water, 5 parts of glacial acetic acid, and 0.5 part of strong hydrochloric acid and 600 parts of alcohol. Reduction is soon complete, the iron salts are decomposed with excess of soda ash and the liquid filtered hot from the precipitated iron oxides, which are washed with a little hot alcohol. On driving off the alcohol and water the crude diamino acetodibenzylamine remains as a thick colourless oil.

To displace the acetyl group 100 parts of the crude diamino acetodibenzylamine are dissolved in 500 parts of strong sulphuric acid. 350 parts of water are slowly added with stirring the temperature allowed to rise to about 100° C. After an hour the mixture is slowly poured into excess of ice and water and the red flocculent compound collected and dried.

The red flocculent compound is treated with a water-soluble diazo compound as follows:—40 parts of the compound are added to 750 parts of warm pyridine. 19 parts of aniline-2:5-disulphonic acid are diazotized in the usual manner. The solution is made alkaline by adding 10 parts of 30% caustic soda lye and run into the pyridine solution whereby a clear orange solution is obtained. This is distilled, under reduced pressure and the pyridine thus recovered. The residue is dissolved in water, filtered if necessary, and the solution is evaporated until the dyestuff crystallizes, or it is salted out. It is filtered off and dried.

The new water-soluble dyestuff is used for printing calico as follows:—1 part of the dyestuff is dissolved in 8 parts of water and the solution is thickened with 8 parts of gum tragacanth. Calico is printed with the paste to an orange-red shade. In the next step diazobenzene-2:5-disulphonic acid is split off. This is done either by steaming for a few minutes with steam containing the vapours of acetic or formic acid or by immersing for a minute in a boiling 25% aqueous solution of common salt containing 25 cc. of acetic acid and 5 cc. of formic acid per litre. After acid treatment the prints are washed in boiling soap to which the print is quite resistant.

The prints may also be fixed by a steaming operation without the use of acid vapours. In this process a substance giving acid on heating in contact with water for instance, sodium chloroacetate, ammonium ethyl sulphate or ammonium thiocyanate is added to the printing mixture.

Example 2.—550 parts of 30% hydrochloric acid are diluted with 750 parts of water and 227 parts of crude m:m'-diaminodibenzylamine dissolved therein and cooled to 2–5° C. Tetrazotization is brought about by adding over twenty minutes a solution of 138 parts of sodium nitrite dissolved in 325 parts of water. The tetrazo solution is then coupled with 526 parts of β-hydroxynaphthoic anilide dissolved in 10,000 parts of water containing 200 parts of caustic soda. The disazo compound separates as a bright red precipitate which is collected, washed alkali-free and dried.

m:m'-diaminodibenzylamine is made as follows:—

Dibenzylamine is dinitrated to give what is believed to be substantially m:m'-dinitrodibenzylamine as described by Ingold (Journal of the Chemical Society, 1925, 1815). The reduction to the diamine is conveniently carried out thus: 287 parts of the crude dinitro compound are dissolved in 600 parts of methanol to which a nickel-on-kieselguhr catalyst containing 6 parts of nickel is added. The whole is heated with stirring with hydrogen, preferably under pressure, until reduction is complete as shown by cessation of absorption of hydrogen. The liquid is filtered to remove catalyst and the methanol and water removed by distillation, the diamine being left as a viscous oil.

The disazo compound, made from the diamine as described above, is brought into a water-soluble form as follows: 39 parts are dissolved in 500 parts of pyridine and the solution cooled to 2–5° C. with ice. Into the cold stirred solution are charged as a moist paste 14.5 parts of the diazo compound derived from aniline-2:5-disulphonic acid. After stirring cold for twelve hours a drop of the reaction mass should dissolve clear in warm weak sodium carbonate solution. If insoluble specks are present a further quantity of the diazo compound is added until a clear solution is obtained in aqueous sodium carbonate. 7 parts of dry sodium carbonate are then added and the pyridine removed by distilling under reduced pressure. The friable residue is dissolved in 300 parts of hot water, adding a further quantity of sodium carbonate if necessary to give an alkaline reaction to the solution. The solution is filtered to remove insoluble matter and salt added at the rate of 25 parts per 100 parts of solution. The dye is thrown out as a red precipitate which is collected and dried. Alternatively the dyestuff may be isolated by cooling the alkaline solution and acidifying with acetic acid and collecting the colour acid. The colour acid is washed with salt solution, pasted with 6 parts of sodium carbonate in 50 parts of water and evaporated to dryness in vacuo. In either case the dyestuff after grinding is obtained as a red powder readily soluble in water.

Cotton may be printed as described in Example 1, when red shades are obtained.

The dyestuff may also be used to dye wool, the dyeing process being carried out thus:—

A dyebath is set, the components being added in the following order (all quantities reckoned on the weight of wool):—

Glauber's salt, 20% as 10% solution.
Dyestuff, 1% to 3% as 1% solution.
Ammonium acetate, 5% as 1% solution.
Ammonia, 1% as liquor 0.88 S. G.

The whole is brought to 40 parts on the weight of wool which is entered at 60° and raised to 90-95° in 15 minutes. Dyeing is continued for 45 minutes when the wool is lifted, rinsed in cold water and entered in a bath (40:1) of 5% sulphuric acid at 85° where it is worked for fifteen minutes, lifted, rinsed, and dried. The solubilizing group is thus eliminated. The wool is dyed in red shades fast to washing. The dyestuff of Example 1 similarly yields on wool orange shades fast to washing.

The tetrazo dibenzylamine may be coupled to other water insoluble azo dye components and the insoluble azo compounds similarly solubilized. Additional examples are set out below:—

| Coupled component | Solubilized by means of diazo compounds from | Shade |
|---|---|---|
| β-naphthol | 1-naphthylamine 4.6.8-trisulphonic acid. | Orange print on cotton. |
| Acetoacet-p-anisidide | 4-sulphoanthranilic acid. | Yellow on wool. |
| p-chloroanilide of 2-hydroxycarbazole-3-carboxylic acid. | Aniline-2.5-disulphonic acid. | Brown on wool. |
| Dimethylaniline | 4-sulphoanthranilic acid. | Yellow print on cellulose acetate. |

*Example 3.*—121 parts of methylbenzylamine are dissolved in 1000 parts of sulphuric acid, D=1.84 and nitrated at 20° with 66.3 parts of 95% nitric acid mixed with 120 parts of sulphuric acid, D=1.84. Three hours are allowed for the reaction to complete and the solution is then poured on ice and made alkaline by adding caustic lye. The nitro base is collected and obtained as an oil. To reduce the nitro group 180 parts of pin dust are stirred with 250 parts of water, 300 parts of alcohol and 3 parts of hydrochloric acid, density 1.18, are added. 166 parts of the nitro compound are added over an hour keeping the solvent gently boiling under reflux and adding from time to time sufficient hydrochloric acid to keep an acid reaction on brilliant yellow paper. The whole is boiled for five hours after all the nitro compound has been added, then made alkaline, filtered from iron oxide, the oxide being washed with hot alcohol. The alcohol is driven off the filtrate and the base collected and dried. It is thus obtained as an oil at ordinary temperatures.

68 parts of the aminomethylbenzylamine are added to 700 parts of toluene and 104 parts of 2:3-hydroxynaphthoyl chloride. The whole is stirred and boiled under reflux for 12 hours, cooled and then the solvent is poured away from the condensation product. The latter is dried, powdered, washed with sodium carbonate solution and dissolved in warm weak caustic soda. The alkaline solution is cooled, filtered and the 2:3-hydroxynaphthoic amide precipitated with acid, collected, washed and dried. It forms pale buff lumps and powder.

An azo compound is formed by diazotizing 240 parts of dehydrothiotoluidine and running the diazo solution into 307 parts of the foregoing 2:3-hydroxynaphthoic amide dissolved in 3000 parts of weak caustic soda solution. An alkaline reaction is maintained throughout the coupling and the azo compound separates as a dark precipitate which is collected, washed and dried.

55.7 parts of the azo compound are dissolved in 1000 parts of pyridine and cooled externally with ice. Into the solution is charged the moist press-cake of 21.2 parts of the diazo compound of 4-sulphoanthranilic acid. After stirring 12 hours the product is worked up as described in Example 2. The dyestuff is obtained as a dark powder readily soluble in water to a purple solution. When thickened and printed on cotton it gives purple shades fixed by acid steaming.

*Example 4.*—Working in the same way as Example 3, 150 parts of ethylbenzylamine are nitrated and reduced to mixed aminoethylbenzylamines which are combined with β-hydroxynaphthoyl chloride.

An azo compound is formed by diazotizing 141.5 parts of 4-chloro-o-toluidine and running the solution into 320 parts of the hydroxynaphthoic amide dissolved in weak caustic soda. The scarlet azo compound is then collected and dried. Solubilization is effected by treating it with an equivalent of the diazo compound of 4-sulphoanthranilic acid as described in Example 3.

The water-soluble dyestuff thus obtained is a red powder. Cotton is printed in red shades by the method described in Example 1 and wool is dyed in red shades fast to washing by the method described in Example 2.

I claim:

1. The method which comprises reacting aminomethylbenzylamine with 2.3-hydroxy-naphthoic acid to form the amide, coupling thereto diazotized dehydrothiotoluidine, coupling to the so-formed dye diazotized 4-sulfo-anthranilic acid through the secondary nitrogen, dyeing, and insolubilizing the dye by splitting off the solubilizing group.

2. The method which comprises reacting aminoalkylbenzylamine with a 2.3-hydroxynaphthoic acid to form an amide, coupling thereto a diazotized primary arylamine, coupling to the secondary nitrogen of the so-formed dye, a diazotized primary arylamine containing water-solubilizing substituents, dyeing, and insolubilizing the dye by removing the solubilizing group.

3. The product represented by the formula:

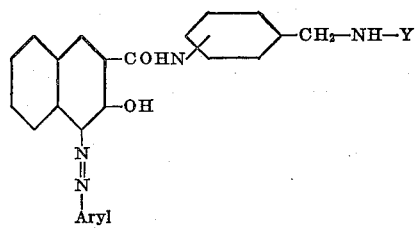

in which Y is alkyl.

KENNETH HERBERT SAUNDERS.